UNITED STATES PATENT OFFICE.

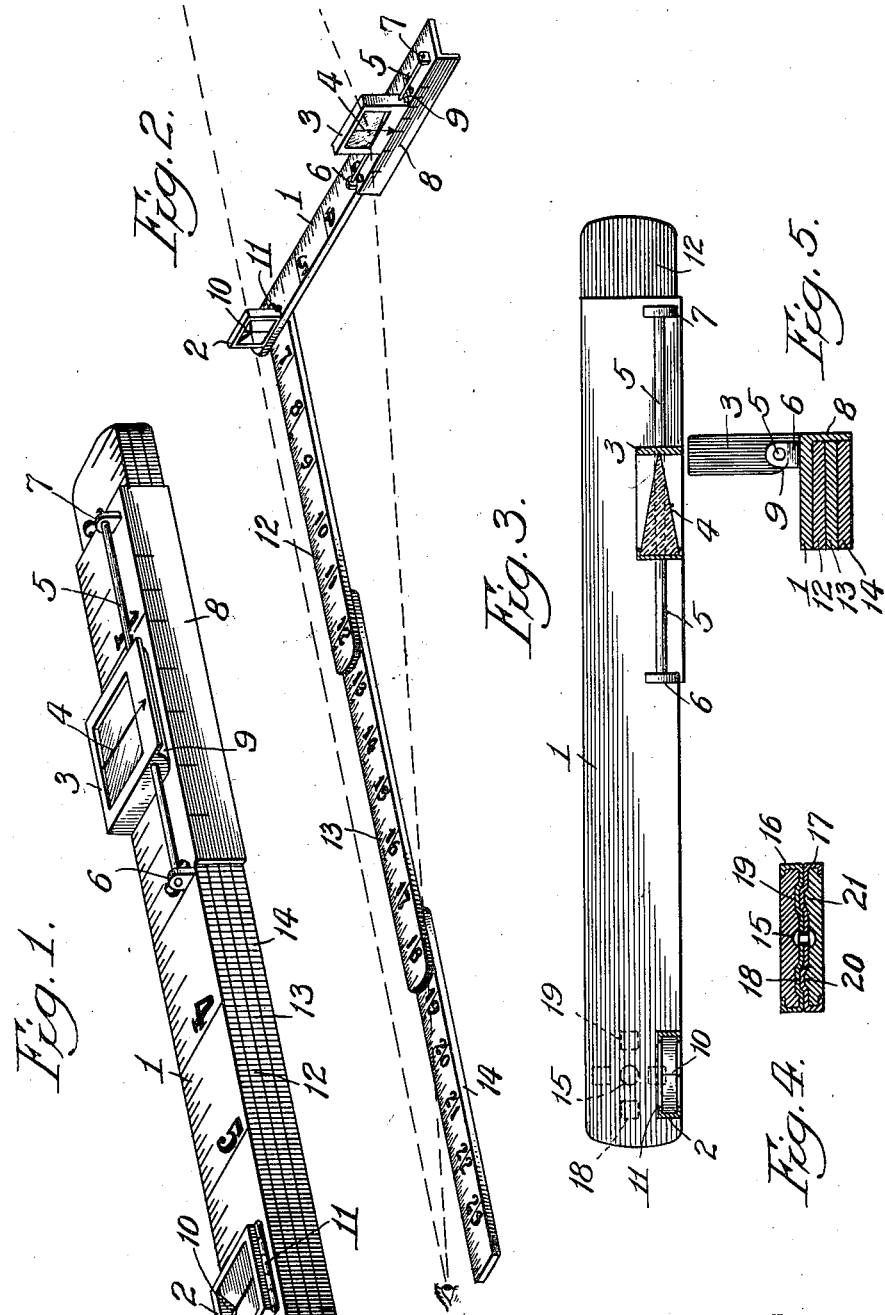

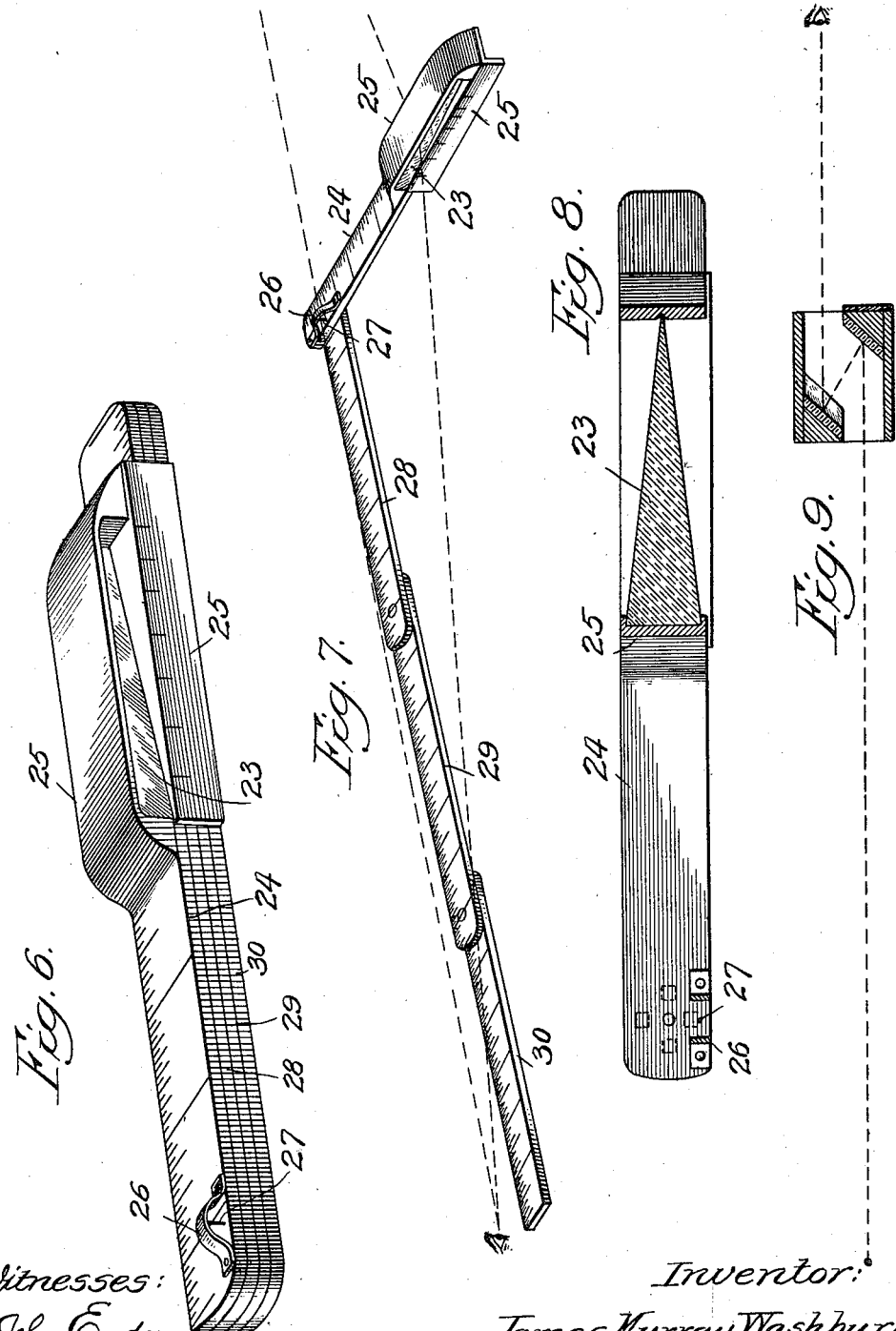

JAMES MURRAY WASHBURN, OF CHICAGO, ILLINOIS.

DISTANCE-GAGE.

1,033,849.

Specification of Letters Patent.  Patented July 30, 1912.

Application filed September 13, 1911. Serial No. 649,087.

*To all whom it may concern:*

Be it known that I, JAMES MURRAY WASHBURN, a citizen of the United States, residing at Chicago, county of Cook, and State of Illinois, have invented a new and useful Distance-Gage, of which the following is a specification.

It is the object of the present invention to provide an apparatus suitable for indicating directly and without any mathematical calculations the distance from the apparatus or from the eye of an observer to a distant object; to provide a distance gage which is compact and portable in structure and which is adapted to indicate directly in linear units distances ranging from about four to one hundred feet.

To accomplish these and other objects the present invention embraces an arrangement which may be designated as a sight bar and which carries at one end a light deflecting device, such as a prism, whereby a divergent ray of light from a distant object may be transmitted to the eye of the observer in such a way that it will converge with a ray of light passing directly from the distant object to the observer's eye.

The sight bar is arranged at a definite angle to the direct line of sight toward the object and is calibrated to read directly in linear units the distance either from the sight bar to the object, or from the observer's eye to the object. The prism may be adjustable along the sight bar and if desired may be replaced by compound mirrors or other arrangements suitable for fulfilling the functions of a prism as herein set forth.

The specific embodiment herein described is intended particularly for the use of contractors, carpenters and structural workers, who are enabled by its use to gage quickly the distance to various parts of a structure or building. I am aware, however, that the basic principles underlying my present invention are widely applicable and can be used in photography and in other arts wherein relatively short distances are to be measured with high speed and reasonable accuracy.

In the accompanying drawings Figure 1 is a perspective view of a complete distance gage folded up for carrying in the pocket. Fig. 2 is a perspective view of the gage unfolded for use, the dotted lines indicating roughly the paths of light from a distant object not shown. Fig. 3 is a plan of the gage showing the sight and the prism in section. Fig. 4 is a section through the joint of the folding member of the gage. Fig. 5 is a section through the sight bar immediately adjacent to the prism. Fig. 6 illustrates a modification wherein the prism instead of being slidably mounted on the sight bar is stationary and is of such length as to embrace the entire calibrated scale of the bar. Fig. 7 is a perspective view of this modification unfolded for use. Fig. 8 is a plan view showing the sight and the stationary prism in section. Fig. 9 is a sectional elevation through a pair of stationary mirrors adapted to serve as the light deflecting device in place of the prisms shown in the preceding figures.

In the construction illustrated by Figs. 1 to 5 inclusive, the distance gage comprises a sight bar 1, carrying at one end a sight 2 and carrying at its other end a prism 3 which is mounted to slide along the sight bar as occasion may require. This prism is preferably a thirty degree prism and has across its front face a vertical line or cross-hair 4 useful in sighting on a distant object. The prism is mounted in a metal box which is supported on a rod 5 carried in ears 6 and 7 which project upward from the flat upper face of the sight bar. Immediately in front of the prism is a depending apron 8 marked off into a scale and coöperating with the cross-hair on the face of the prism to indicate directly in linear units, such as feet, the distance to the distant object. This scale may be calibrated either to indicate the distance from sight 2 to the object or from the observer's eye to the object, as desired. The lower back corner of the prism-supporting box is cut away at 9 to permit folding down as illustrated in Fig. 1.

The sight 2 has a V shaped opening with a central sight line 10 and is hinged at 11 so that it may be folded down into small compass. For the proper use of the sight bar and its associated parts, it is necessary to locate the bar at a definite distance from the eye of the operator. In the specific embodiment illustrated in the drawings of this application this function is fulfilled by a folding member made up of the sections 12 13 and 14 hinged together and adapted to unfold, forming a rigid, straight arm about eighteen to twenty-four inches long and carrying at its outer end the sight bar 1 of the gage.

It is necessary that the sight bar should be arranged at a definite and predetermined angle to the folding arm, such for instance as a right angle, and to accomplish this result with certainty, the hinge between the sight bar and the folding arm may be constructed as illustrated in section, Fig. 4. A rivet 16 serves as a pivot for the joint and engages with the inner faces of metal sheathings 16 and 17, one of which envelops the edges of the folding arm and the other of which embraces the edges of the sight bar. One of the sheathings has indentations 18 and 19 forming pockets into which corresponding projections 20 and 21 of the other sheathing may fit with a yielding engagement. By having four of these pockets as illustrated in Fig. 3, the two connected members may be placed at right angles or in direct alinement and will maintain that relation until forcibly diverted therefrom by the operator. The folding joints between the members 12, 13 and 14 are similarly equipped with sockets and projections so that they may be maintained in a straight line when once unfolded.

To use the distance gage, it is held with one end of the folding arm directly below an eye of the operator so that the direct line of sight from that eye will pass through the sight box 2 to the distant object. Then the prism is moved inward and outward until the image of the distant object appears to the operator as bi-sected by the cross-hair 4. The operator then reads from the scale directly below the cross-hair and this reading indicates directly and without any mathematical calculations the distance in feet or other linear units from the eye of the operator to the distant object. In a certain sense the calibrated scale may be regarded as indicating the distance along the sight bar between the direct line of sight and the deflected line of sight, but the reading is not in distances along the bar, but in distances at right angles therewith, that is, along the direct line of sight toward the distant object.

In the modification illustrated in Figs. 6 to 8 inclusive the prism 23 is rigidly mounted on the sight bar 24 and is covered and protected by a metal boxing 25, the corners of which are rounded off so that the instrument can be easily carried in the operator's pocket. The calibrated scale is carried on a depending apron which overlaps the other folding portions of the instrument when the structure is folded up for storage.

The sight 26 comprises a bent metal arch from which a sight point or line 27 extends downward. The folding arm comprises the hinged sections 28, 29 and 30 equipped with the spring joints as previously disclosed in connection with the other modification. In using the structure shown in Fig. 7 the folding arm is placed with its end immediately adjacent the operator's eye and the operator brings the instrument into position with its sight 26 in alinement with the distant object. The operator then looks at that object through the prism and then reads off from the adjacent scale, taking the value immediately below the image in the prism. This scale is so calibrated that the reading is one of linear units to the distant object. As in the case of the modification first described, the prism may have an angular width of thirty degrees, though its length must be considerably greater to cover the same range of distances.

Although a prism has many advantages as a means for deflecting light to the observer's eye as above described, other light deflecting means may be used, as for instance, the special arrangement of mirrors illustrated in Fig. 9. This figure shows two mirrors 31 and 32 held in a suitable box or frame work and set at such angles relative to each other and to the axis of the sight bar, that light, coming from a distant object, will be deflected for transmission to the eye of the operator. Such a grouping of mirrors may be mounted in fixed position on a sight bar in place of prism 23 of Fig. 8 or may be mounted to slide on the bar as in the case of prism 3 Fig. 2.

I am aware that the basic ideas herein disclosed may be embodied in apparatus differing in many ways from those above described and that various modifications may be constructed without departing from the spirit of my invention as defined by the appended claims.

Having described my invention, what I claim as new and desire to secure by Letters Patent is:

1. A distance gage comprising a sight bar having at one end a sight which may be brought into alinement with a distant object, a light deflecting device associated with said sight bar and in which an image of said object may be made to appear a scale laid out along said sight bar and calibrated to indicate directly in linear units the distance to said distant object, and means for positioning said bar in proper relation to the eye of the observer.

2. In a distance gage, the combination of a sight bar, a sight carried by said bar, means for adjusting said sight bar into such position before an operator's eye that a distant object may be viewed in alinement with said sight, a light deflecting device through which said distant object may be seen by the operator and a calibrated scale laid off on said sight bar in position to indicate directly the distance to the distant object.

3. In a distance gage the combination of a sight bar, a sight carried by said bar, means for supporting said bar at a predetermined distance from the eye of the operator in such position that a distant object may be viewed in alinement with said sight, means for controlling the angular position of said sight bar with regard to the direct line of sight to said object, a light deflecting device through which said distant object may be viewed by the operator, and a calibrated scale laid out along said sight bar and coöperating with said light deflecting device in the measurement of the distance to said distant object.

4. In a distance gage the combination of a sight bar, a sight on one end of said bar, a prism carried by the other end of said bar, a rigid arm for holding said bar at a predetermined distance from the eye of the operator and a scale laid out adjacent to said prism and calibrated to indicate directly in linear units the distance from the eye of the operator to the distant object.

5. In a distance gage, the combination of a sight bar, an arm for supporting said bar, said arm comprising a plurality of folding sections, a spring joint between said bar and said arm to insure adjustment of said bar at right angles to said arm, a sight carried by said bar in direct alinement with said arm and in such position that when one end of the arm is at the operator's eye said sight may be brought into alinement with a distant object, a prism carried by said sight bar and movable inward and outward thereon, and a scale adjacent to said prism and calibrated to indicate in linear units the distance to the distant object when that object appears in the prism.

6. A distance gage comprising in combination a sight bar, means for gaging the proper distance at which said bar is to be held from the eye of the observer, means for insuring proper angular position of said bar with respect to the line of sight from the observer's eye to a distant object, light deflecting means associated with said bar for bringing to the eye of the observer deflected light from said distant object, and a scale associated with said sight bar for gaging the divergence of said deflected light, said scale being calibrated to indicate the distance to the distant object.

In witness whereof, I hereunto subscribe my name this 6th day of September A. D. 1911.

JAMES MURRAY WASHBURN.

Witnesses:
PAUL W. BAUMANN,
ARBA B. MARVIN.